United States Patent Office 3,713,880
Patented Jan. 30, 1973

3,713,880
PROCESS FOR THE MODIFICATION OF THE SURFACE PROPERTIES OF MOULDINGS MADE OF TRANSPARENT THERMOPLASTIC SYNTHETIC RESINS
Ulrich Krekeler, Munich, Germany, assignor to Agfa-Gevaert Aktiengesellschaft, Leverkusen, Germany
No Drawing. Filed Dec. 7, 1970, Ser. No. 95,974
Claims priority, application Germany, Dec. 12, 1969,
P 19 62 354.2
Int. Cl. B44d 1/22
U.S. Cl. 117—138.8 B          4 Claims

ABSTRACT OF THE DISCLOSURE

Mouldings made of transparent synthetic resins, such as optical lenses with improved scratch-resistance and electrical conductivity can be produced by coating the mouldings with a layer of a solution of a mixture of alkyl silicate, trifunctional and/or bifunctional organosilanes and an antistatic additive and subjecting the mouldings to a heat treatment.

---

The present invention relates to a process for the modification of the surface properties of mouldings made of transparent thermoplastic synthetic resins and, in particular, of optical lenses and other optical parts made of such synthetic resins.

The use of optical lenses made of transparent organic synthetic resins instead of glass is not new. Such lenses may be made, for example, of polystyrene, polycarbonate, Plexiglas® (=polymethacrylate) or other synthetic resins. A disadvantage of most of the synthetic resins used for this purpose is that they are not sufficiently hard; it is found that optical lenses made of such organic synthetic resins are generally very liable to get scratched so that their optical quality is soon impaired.

Another disadvantage of the organic synthetic resins used is their low electrical conductivity. Thus some of the synthetic resins mentioned, e.g. polycarbonate, are eminently suitable for the manufacture of electric insulating materials but when used for optical lenses, especially for use in photographic cameras, this property is not so desirable since it gives rise to electrostatic charges which attract particles of dust.

The modification of surface properties under discussion here, therefore, means mainly the improvement in scratch resistance and electrical conductivity.

Several processes have become known for coating inorganic and organic glass. These processes are mainly aimed at reducing reflection and consist, for example, in coating the glass with a glass-like layer of silicic acid or a layer of polymeric substituted alkyl silicon compounds. The production of weather-resistant, chemically-resistant, scratch-resistant and water repellent coatings based on silicone resin for organic glass is also known.

It is, therefore, the object of the present invention to improve the scratch resistance and electrical conductivity of mouldings made of transparent thermoplastic synthetic resins without, however, impairing the permeability to light.

A process for the modification of the surface properties of mouldings made of transparent synthetic resins by coating them with a layer of silicone resin has now been found which is characterized in that the mouldings are coated with a solution of a mixture of alkyl silicate, trifunctional and/or bifunctional organosilane and an antistatic additive in an organic solvent and are then heat treated to harden the coating.

The alkyl silicates to be used according to the invention are preferably those having alkyl groups which contain one or two carbon atoms. Satisfactory results are achieved, for example, by using orthosilicic acid tetraethyl ester.

The organosilanes to be used according to the invention are compounds which contain one or two aliphatic groups directly attached to the silicon atom. The terms "bifunctional" and "trifunctional" refer to the total number of substituents which are attached to the silicon atom and can be saponified by water, e.g. alkoxy groups or chlorine atoms. According to the present invention, it is especially advantageous to use organosilanes of the following formulae:

| $RSi(X)_3$ | $R_2Si(X)_2$ |
|---|---|
| trifunctional | bifunctional | wherein R represents saturated or olefinically unsaturated aliphatic radicals having 1–3 C-atoms, preferably 1 or 2 C-atoms, in particular vinyl radicals. X denotes a radical which is capable of being hydrolysed, e.g. a halogen atom, especially chlorine, or a short-chained alkoxy group, e.g. methoxy or ethoxy groups. Trifunctional organosilanes are preferred.

The antistatic additives may be the usual additives used for this purpose. Salts of long-chained aliphatic carboxylic acids having 12–30 C-atoms, for example, have been found to be suitable, especially alkali metal salts and, in particular, lithium salts and more especially the lithium salt of stearic acid. The salts of certain transition metals are also suitable, e.g. tin or cadmium salts. The solutions of coating may contain up to 2.5% by weight of antistatic additives, preferably 0.05 to 0.2% by weight. The upper limit is set by the requirement that the transparency of the coating must not be impaired.

A solution of silicic acid ester, bifunctional or trifunctional organosilanes and antistatic additives is prepared in an organic solvent. Suitable for use as solvents are monovalent or higher valent aliphatic alcohols, glycols, glycol ethers or esters of mixtures thereof.

Other additives may also be added to the solutions to achieve special properties, e.g. UV-absorbents.

The solution is acidified to pH 2 to 4 by the addition of acids, preferably to pH 3 to 3.5. Suitable acids are, for example, inorganic mineral acids such as hydrochloric acid, sulfuric acid or phosphoric acid. Hydrochloric acid is generally preferred since it is the one which can most easily be removed in the heat treatment which follows the coating operation. The addition of acid brings about saponification of the silicic acid ester and of the alkyl silane, causing the formation of an organosol. The composition of suitable coating mixtures is defined by the following particulars given below by way of example.

| Constituent: | Percent by weight |
|---|---|
| Organosilanes | 0.5–3 |
| Ethyl orthosilicate | 2–10 |
| Alkyl ether or ester of ethylene glycol having alkyl groups with 2 to 4 C-atoms | 40–70 |
| Monohydric alcohols having 1 to 4 C-atoms | 10–40 |
| Mineral acid | 2–5 |
| Lithium salt of stearic acid or tin (II) chloride | 0.05–2.5 |

The silicic acid ester content is preferably 4–6% by weight and the organosilane content 1–2% by weight.

The mouldings are coated with such a mixture by one of the known processes. Thus, for example, the article which has to be coated may be dipped into the solution and withdrawn from it at a constant speed. The excess solution runs off and a smooth film is formed. Alternatively, the mouldings may be dipped into the solution and the excess solution may then be removed by spinning. In many cases it is sufficient to apply the solution to the mouldings with a brush.

When the mouldings have been coated, they are subjected to a heat treatment to harden the coating. A temperature of between 50° C. and 90° C. is generally sufficient for this purpose. The time required for hardening depends upon the temperature employed and, of course, on the thickness of the layer required.

In the course of the hardening process, the saponified silicic acid ester and the organosilanes are converted into polymer structures which are cross-linked to varying extents and have the following structural units:

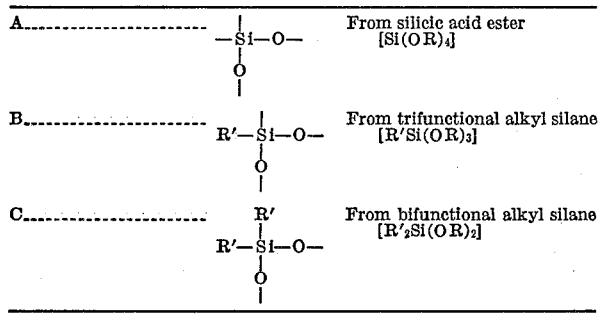

According to its composition, therefore, the coating may be regarded as a structure consisting mainly of $SiO_2$ in which the antistatic additives are dispersed. The organic silicon structural elements B, possibly containing some C, impart sufficient elasticity to the hard $SiO_2$ structure so that highly scratch-resistant coatings are obtained. Clear coatings free from cloudiness and cracks can be produced in this way up to a layer thickness of 10 μm. Layer thicknesses of 0.3–1.5 μm are preferred. The coatings have a sufficiently high electrical conductivity so that static charges are not observed even in warm, dry air.

EXAMPLE

Transparent mouldings, e.g. lenses, of polystyrene, polycarbonate or methyl polymethacrylate coated by the dip-coating method with a solution of the following composition:

|  | Percent by weight |
|---|---|
| Ethyl orthosilicate | 5.0 |
| Vinyl triethoxy silane | 1.25 |
| Tin-(II) chloride | 1.5 |
| Butyl glycol | 62.6 |
| Ethyl glycol | 3.0 |
| Ethanol | 17.5 |
| Butanol-(1) | 6.65 |
| 10% aqueous hydrochloric acid solution | 2.5 |

To prepare the above solution, the silicic acid ester and organic silicon compound are first added to the solvent mixture of alcohols and glycols. The antistatic agent is then stirred into this mixture and finally the acid is added. After the coating operation, the parts are heated in a drying cupboard for one hour at 85° C. Transparent, firmly bonded, antistatic coatings which have excellent scratch resistance are obtained in all cases. The thickness of the layer is 0.5 μm.

The table below shows the scratch resistance and surface resistance of this layer in comparison with an uncoated surface of methyl polymethacrylate and a comparison layer which does not contain any vinyl silane units, the casting solution in the last mentioned case containing only orthoethyl silicate.

| Sample | Scratch resistance in percent opacity | Surface resistance in $\Omega/cm.^2$ |
|---|---|---|
| Uncoated | 8.75 | $>10^{15}$ |
| With above casting solution | 2.5 | $\sim 10^8$ |
| With above casting solution but without vinyl triethoxy silane | 3.75 | $\sim 10^8$ |

The scratch resistance and surface resistance are determined as follows:

The electric surface resistances were determined according to DIN 53482, using the electrode arrangement C.

All the results were obtained under constant atmospheric conditions of 20° C. and 60% relative humidity.

The scratch resistance of coated and uncoated samples was determined on a plate-shaped material in a special apparatus (according to H. O. Buzzell, Manufacturing Optician International, May 1968, p. 568).

The plate of material was clamped into a support and abraded with a felt band to which finely divided grinding dust was applied. The resulting surface opacity of the plates is then determined quantitatively by a measurement of the scattered light (ASTM 1003).

In order to compare surfaces of different hardness, it is sufficient to compare the increase in opacity percent obtained under identical conditions.

I claim:

1. A method of modifying the surface properties of moldings made of transparent synthetic resins which comprises the steps of coating and hardening on the surface of a molded body of transparent synthetic resin having optical properties, a solution of an organic solvent, a mixture of 2–10% by weight of an alkyl silicate and 0.5–3% by weight of an organosilane selected from the group of the following formulae:

$$RSi(X)_3 \text{ and } R_2Si(X)_2$$

wherein:
R represents aliphatic radicals having 1–3 carbon atoms,
X represents a halogen and short chain alkoxy group and an antistatic additive selected from the group consisting of alkali metal, tin and cadmium salts of aliphatic carboxylic acids having 12–30 carbon atoms.

2. A process according to claim 1, wherein a coating solution of the following composition is applied:

|  | Percent by weight |
|---|---|
| Organosilane selected from the group consisting of trifunctional vinyl silane or methyl silane | 0.5–3 |
| Ethyl orthosilicate | 2–10 |
| Alkyl ether of ethylene glycol having groups with 2 to 4 C-atoms | 40–70 |
| Monohydric alcohols having 1 to 4 C-atoms | 10–40 |
| Mineral acid | 2–5 |
| Alkali metal salt of a long-chained aliphatic carboxylic acid or a tin-(II) salt | 0.05–2.5 |

3. A process for applying a coating solution to the surface properties of moldings made of transparent synthetic resins which comprises the steps of coating and hardening on the surface of a molded body of transparent synthetic resin having optical properties, characterized in that the coating solution contains 4–6% by weight of ethyl silicate, 1–2% by weight of a silane selected from the group consisting of trifunctional vinyl silane or methyl silane and 0.05 to 2.5% by weight of lithium stearate or tin(II) chloride.

4. A process for treating the surface of a molded body of transparent synthetic resin having optical properties which comprises dipping the surface in a solution of an organic solvent, a mixture of 2–10% by weight of an alkyl silicate and 0.5–3% by weight of an organosilane selected from the group consisting of an organosilane of the following formulae:

$$RSi(X)_3 \text{ and } R_2Si(X)_2$$

wherein:
R represents aliphatic radicals having 1–3 carbon atoms,
X represents a halogen and short chain alkoxy group and an antistatic additive selected from the group consisting of alkali metal, tin and cadmium salts of aliphatic carboxylic acids having 12–30 carbon atoms, and then heat treating the coated surface at a temperature of between 50 and 90° C. to harden the coating to increase the scratch resistance and electrical conductivity of the molded body.

References Cited

UNITED STATES PATENTS

| | | | |
|---|---|---|---|
| 2,761,797 | 9/1956 | Young | 117—138.8 X |
| 3,017,384 | 1/1962 | Modic | 117—126 X |
| 3,028,347 | 4/1962 | Chevalier | 117—132 X |
| 3,163,534 | 12/1964 | Adams et al. | 117—132 X |

WILLIAM D. MARTIN, Primary Examiner

T. G. DAVIS, Assistant Examiner

U.S. Cl. X.R.

117—138.8 F, 138.8 UA, 161 ZA, 169 A